Jan. 22, 1929.
M. E. ROE
1,700,110
VEHICLE BRAKING MECHANISM
Filed Dec. 17, 1924    2 Sheets-Sheet 1
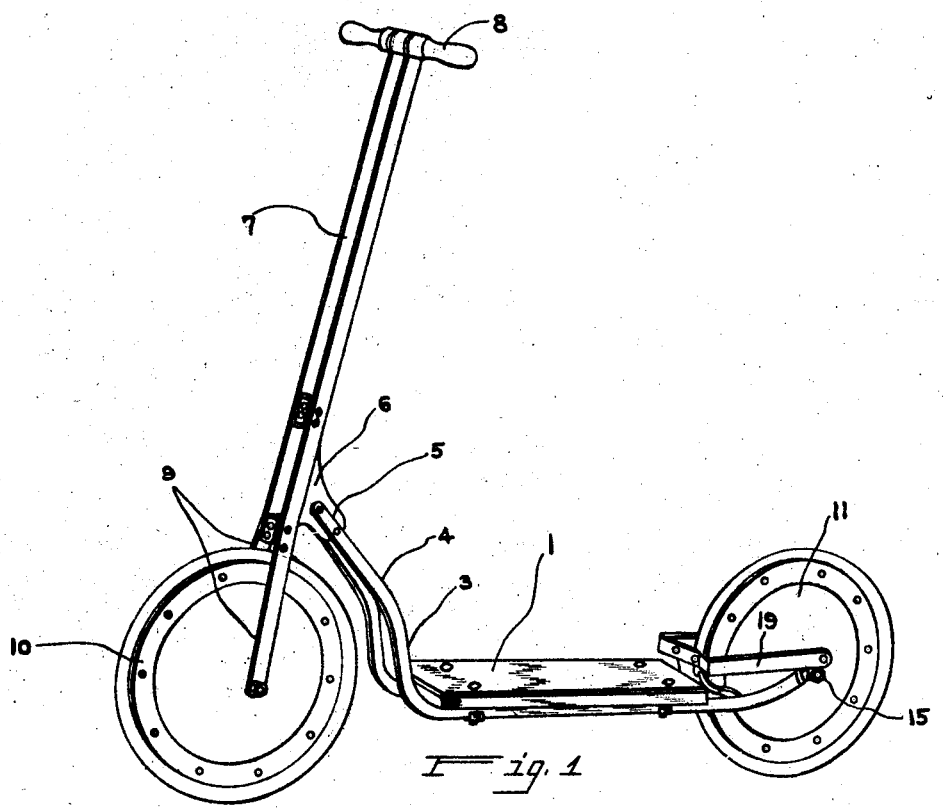
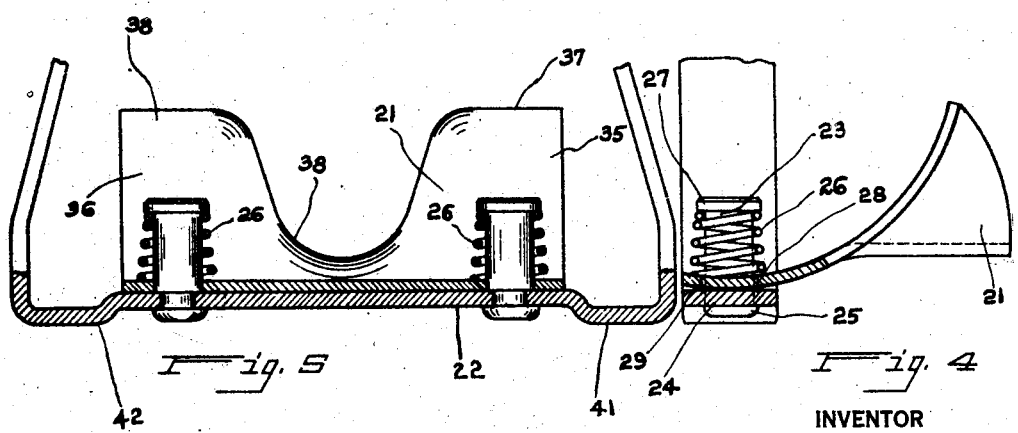
INVENTOR
Mayo E. Roe
BY
Richey Slough & Watts
ATTORNEYS

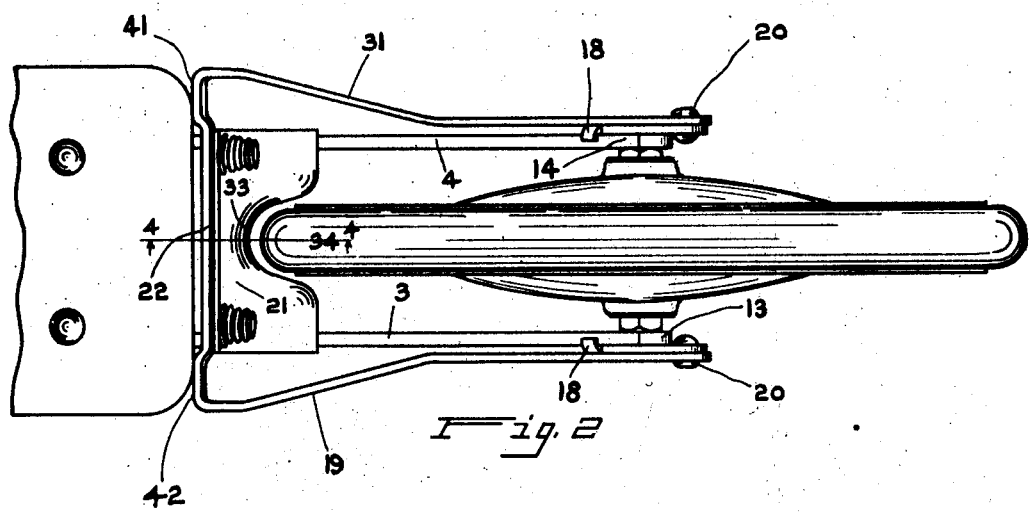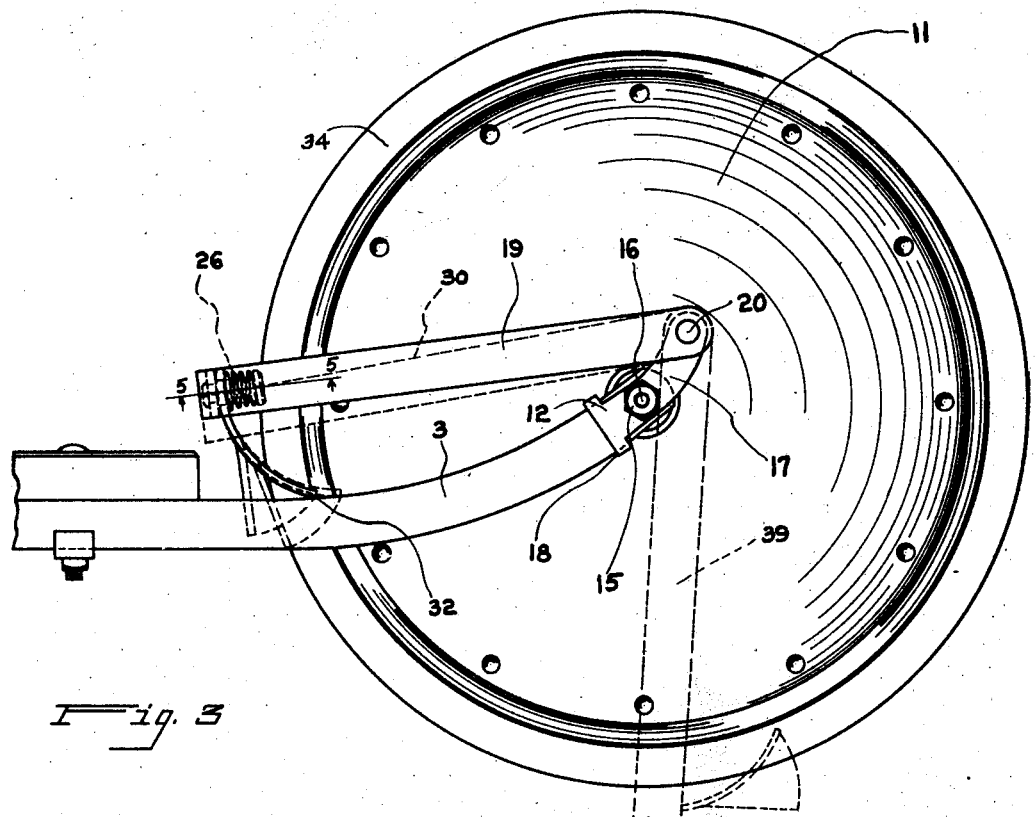

Patented Jan. 22, 1929.

1,700,110

UNITED STATES PATENT OFFICE.

MAYO E. ROE, OF ELYRIA, OHIO, ASSIGNOR TO THE COLSON COMPANY, OF ELYRIA, OHIO, A CORPORATION OF OHIO.

VEHICLE BRAKING MECHANISM.

Application filed December 17, 1924. Serial No. 756,503.

This invention relates to vehicle braking mechanisms and more particularly to a vehicle braking mechanism applicable for use on that type of vehicles now commonly known as "scooters".

An object of my invention is to provide a brake mechanism for a scooter which can be operated by the foot of the rider.

Another object of my invention is to provide such a brake mechanism which will be efficient in operation, durable in use and at the same time so designed that the manufacturing cost of the same will be relatively low.

Another object of my invention is to provide a brake mechanism applicable for use in a scooter, and in which there may also be combined the function of a stand for the vehicle.

Another object of my invention is to provide an improved combined brake and stand for two-wheeled vehicles which will have two operative positions and a normal inoperative position, one of the operative positions being that in which a brake is applied to the vehicle, and the other operative position being that in which the mechanism is used as a stand to support the wheel when it is not in use.

Other objects of my invention will become apparent as the description of an embodiment thereof progresses and in which description reference will be had to the accompanying specification and the accompanying drawings referred to therein.

Referring to the drawings—

Fig. 1 shows a perspective side elevation of a scooter comprising an embodiment of my invention;
Fig. 2 shows a plan view of the said embodiment, a fragment of the scooter of Fig. 1 being shown in connection therewith;

Fig. 3 shows a side elevation of the apparatus of Fig. 2, a portion of the apparatus being also indicated in the two operative positions it assumes in practice, such positions being indicated by dotted lines;

Fig. 4 shows a section taken on the line 4—4 of Fig. 2;
Fig. 5 shows a section taken on the line 5—5 of Fig. 3, this figure and the foregoing figure being illustrative of the brake shoe and associated parts.

Referring now to all of the figures in which like parts are designated by like reference characters, at 1, I show a foot board for a two-wheeled scooter of a well known type carried on frame members 3 and 4 which are joined at 5 to a steering knuckle 6 rotatably secured in a steering column 7 having handles 8 and terminating at its lower end in a fork 9. The fork 9 carries at its lower end a rotatable front wheel 10 which is dirigible by means of the handles 8. The frame members 3 and 4 extend rearwardly to a rear wheel 11 carried between the ends of the two frame members 3 and 4, the wheel 11 being freely rotatable, on an axle 16 secured in the ends 13 and 14 of the frame side members 3 and 4.

As is well-known, such a scooter vehicle as so far described is propelled by the rider resting one foot on the foot board 1 and holding the handles 8 and thrusting the other foot rearwardly on the ground to shove the vehicle ahead, the weight of the rider's body being carried on the foot board and at intervals the rider may rest his entire weight on the foot board placing both feet thereon as when coasting.

It is well known that children, who commonly use such vehicles, may desire to use them for coasting down severe grades and into streets where they are endangered by passing traffic, and it is an object of my invention therefore to permit the immediate stopping of the scooter vehicle by the operator through the provision of an improved brake mechanism which will be very efficient to quickly prevent rotation of the rear wheel 11 by bringing into engagement with the tire 42 thereof a brake shoe 21. This is accomplished through the medium of the instrumentalities which I will now describe.

At 15, on either side of the wheel 11, I provide securing nuts for the end of the axle 16 and which clamp to the stationary portion of such axle the side frame members 3 and 4 at their ends 13 and 14, which are perforated and which are passed over the ends of the stationary axle shaft shown at 16. At 17 I provide a supporting bracket perforated to admit the end of the axle shaft 16 and having bent over ears or lugs 18 resting against the top and bottom edges of the side frame members. Two complementary brackets 17 are provided one for each side of the vehicle and in like manner are clamped by the nuts 15 together with the side frame members to the stationary axle 16. The flanges 18 prevent rotation of the brackets about the axle shaft 16. At 19, I provide an approximately U-shaped element or lever pivotally secured by bolts 20 to the brackets 17, the bolts 20 passing through a hinge perforation in the ends of the brackets and the U-shaped member, and the opening through the member ends being larger, somewhat, than the diameter of the bolts or rivets 20 which passes through the same.

At 21 I show a friction brake shoe of sheet steel carried by the intermediate portion 22 of the so-called U-shaped member 19 being secured thereto by a pair of studs 23 rigidly mounted at 24 on the mid-part 22 of the said member as by riveting them thereon, the rivet heads being shown at 25. A pair of springs 26 are interposed between an end flange 27 and the surface 28 of the brake shoe 21, the brake shoe 21 being perforated as shown at 29 and the stems of the studs 23 passing through such perforation prior to the riveting operation whereby the rivet heads 25 are formed. The springs 26 press the brake shoes 21 against the inner side of the intermediate portion 22 of the U-shaped member, and normally maintains the brake shoe in such position relative to the side arms 30 and 31 of the U-shaped member that the sides of the brake shoe will rest as shown at 32 upon the side frame members 3 and 4 and maintain the central or intermediate or braking surface portion 33 of the brake shoe 21 out of contact with the vehicle tire 12, Fig. 3.

Referring more particularly to Figs. 3 and 4, it will be seen that the brake shoe 21 is so formed as to have forwardly extending side portions 35 and 36 depending downwardly from the supporting portion 22 of the U-shaped member and a more downwardly extending intermediate portion 33, the downwardly extending intermediate portion being rearwardly indented and presenting a braking surface toward the opposing portion of the vehicle wheel tire which is substantially parallel thereto, but removed therefrom, when the apparatus is in the normal position as shown in Fig. 3, sufficiently that there will be no engagement between any portion of the brake shoe 21 and the tire. The forwardly extending side portions 32 in such position of the parts will rest upon the side frame members as shown at 32, the forward edges 37 and 38 of the brake shoe side portions making contact therewith. The spring 26 will normally resist any change of position of the brake shoes relative to the side frame members and the side arms of the U-shaped member, resiliently until a strong enough force is applied to distort the spring 26. However, when the vehicle is in use and it is desired to apply the brake, this is accomplished by the operator pressing his foot against any portion of the member 19 forwardly of the pivots 20, at which time the pressure exerted downwardly will cause the brake shoe 21 to bring its braking surface 33 into intimate contact with the periphery 34 of the vehicle wheel tire 12, since such downward pressure will cause by camming action, a movement of the point 32 at edges 37 and 38 of the brake shoe 21 to be moved rearwardly, the brake shoe 21 rotating rearwardly on the stud 23 against the power of the compression spring 26 which normally prevents such rotation. Whenever the operator wishes to discontinue the braking effort he removes his foot from the U-shaped brake lever 19 at which time the springs 26 tending to regain their less stressed form as shown in Fig. 4, will retract the brake shoe 21 to its normal non-braking position as shown in solid lines in Fig. 3, the braking position of the brake lever and shoe being shown closely adjacent thereto, but with dotted lines.

Whenever it is desired that the apparatus be employed to perform the function of a stand to support the vehicle, the U-shaped member 19 is rotated on its supporting pivots 20 upwardly, rearwardly and downwardly until it takes the position shown with dotted lines at 39 at which time the end 40 of the U-shaped member 19 comprising the intermediate portion 22 will rest upon the ground, the protruding portions 41 and 42 adjacent the extreme sides of such intermediate portion 22 making first contact with the ground. Pivot 20 is located so that the stand is rotated slightly beyond vertical position, and bears against the nut 15 to prevent further rotation. The middle of the intermediate portion 22 between the protruding portions 41 and 42 is recessed from such portions so as to give the vehicle, generally, especially when used upon a hard surface, the so-called "three-point contact" with the supporting surface, one of the points being the front wheel and the other two points being the protruding portions 41 and 42 of the U-shaped stand 19.

Whereas I have called the U-shaped member 19 at various times a brake lever, a stand or U-shaped member, it will be understood that I refer to the same element and employ the different terms to denote at different times the changing functions thereof.

Having thus described my invention in a particular embodiment, I am aware that my invention may be employed in structures differing widely therefrom, but comprehended within my invention. I therefore claim—

1. In a braking mechanism for two-wheeled vehicles, the combination with the vehicle frame of a brake lever pivoted thereto at a side of the rear wheel of the vehicle and carrying a brake shoe normally disposed adjacent the tire thereof but spaced therefrom, spring means for normally maintaining the brake shoe out of contact with the said tire, a portion of the said lever being adapted to be engaged and thrust downwardly by the foot of the rider to overcome said spring means and to cause said brake shoe to frictionally engage the vehicle wheel tire, said lever being rotatable about its pivots from said normal and braking positions to carry its free end about the tire of the vehicle to a position of engagement with the ground or other surface upon which the vehicle rests, said ground engaging lever portions extending to either side of the vehicle to comprise with the vehicle front wheel, a substantially triangular support.

2. In a braking mechanism for two-wheeled vehicles, the combination with the vehicle frame of a brake lever pivoted thereto at a side of the rear wheel of the vehicle and carrying a brake shoe normally disposed adjacent the tire thereof, spring means for normally maintaining the brake shoe out of contact with the said tire, a portion of the said lever being adapted to be engaged and thrust downwardly by the foot of the rider to overcome said spring means and to cause said brake shoe to frictionally engage the vehicle wheel tire, said lever being approximately U-shaped and carrying the said brake shoe at its intermediate portion, said lever being rotatable about its pivots from said normal and braking positions to carry its free end about the tire of the vehicle to a position of engagement with the ground or other surface upon which the vehicle rests, said ground engaging lever portions extending to either side of the vehicle to comprise with the vehicle front wheel, a substantially triangular support.

3. In a two-wheeled vehicle of the "scooter" type, the combination with the two wheels of the vehicle, of a substantially horizontal frame joining the wheels and supported thereby, of a platform carried thereby, a brake shoe, a lever fulcrumed to the frame with a free end extended above the level of said platform and at the rear thereof, said lever rotating about said fulcrum when its free end is depressed to move said brake shoe into contact with a wheel tire, said lever being movable to take a vehicle supporting position wherein it will support an end of the vehicle with the adjacent wheel lifted out of contact with the vehicle supporting surface.

4. In a two-wheeled vehicle of the "scooter" type, the combination with the two wheels of the vehicle, of a substantially horizontal frame joining the wheels and supported thereby, of a platform carried thereby, a brake shoe, a lever fulcrumed to the frame with a free end extended above the level of said platform and at the rear thereof, said lever rotating about said fulcrum when its free end is depressed to move said brake shoe into contact with a wheel tire, said lever being movable to take a vehicle supporting position wherein it will support an end of the vehicle with the adjacent wheel lifted out of contact with the vehicle supporting surface, said shoe having a vehicle frame contacting portion to guide it into proper contacting engagement with the wheel tire.

5. In a two-wheeled vehicle of the "scooter" type, the combination with the two wheels of the vehicle, of a substantially horizontal frame joining the wheels and supported thereby, of a platform carried thereby, a brake shoe, a lever fulcrumed to the frame with a free end extended above the level of said platform and at the rear thereof, said lever rotating about said fulcrum when its free end is depressed to move said brake shoe into contact with a wheel tire, said lever being movable to take a vehicle supporting position wherein it will support an end of the vehicle with the adjacent wheel lifted out of contact with the vehicle supporting surface, said shoe having a vehicle frame contacting portion to guide it into proper contacting engagement with the wheel tire, said shoe contacting portion normally engaging the frame, said lever being substantially U-shaped with its fulcrum at the ends thereof.

6. A toy of the character set forth the combination of a wheeled frame, a platform thereon, a supporting rack pivoted on the frame adjacent the axle of one wheel, and a yieldable shield carried by the rack in close proximity to the periphery of the wheel.

7. A toy of the character set forth the combination of a wheeled frame, a platform thereon, a supporting rack pivoted on the frame adjacent the axle of one wheel, and a shield yieldably connected to the rack and disposed in close proximity to the periphery of the wheel.

8. In a device of the class described, the combination with a supporting frame, of a rear wheel journaled thereon, a lever in the form of a loop striding said wheel and pivotally secured at its rear portion to the rear portion of said frame, a brake element operable by said lever to engage the peripheral portion of the wheel, and a spring associated with said lever adapted to normally retract it from brake operating position.

9. The combination with a scooter having a rear wheel, of a combined fender and brake for said wheel, and an operating member for applying the brake, said operating member being mounted for downward movement into engagement with the ground to form a stand for the scooter.

10. In a vehicle of the class described, a frame having a platform upon which an operator may stand, front and rear supporting wheels for the frame, and a brake lever pivoted to the frame and operable by the heel of a foot resting upon the platform, said brake lever comprising a U-shaped bar having its legs angled to form laterally spaced lever arms and having its loop portion disposed in heel engageable position, and a member operable by rotation of the lever for braking engagement with the rear wheel.

In testimony whereof I hereunto affix my signature this 11th day of December, 1924.

MAYO E. ROE.